US006501073B1

(12) United States Patent
Mylchreest et al.

(10) Patent No.: US 6,501,073 B1
(45) Date of Patent: Dec. 31, 2002

(54) MASS SPECTROMETER WITH A PLURALITY OF IONIZATION PROBES

(75) Inventors: Iain C. Mylchreest, Gilroy, CA (US); Tina A. E. Hemenway, San Jose, CA (US); Richard E. Hartford, Aromas, CA (US)

(73) Assignee: Thermo Finnigan LLC, San Jose, CA (US)

( * ) Notice: Subject to any disclaimer, the term of this patent is extended or adjusted under 35 U.S.C. 154(b) by 35 days.

(21) Appl. No.: 09/684,744

(22) Filed: Oct. 4, 2000

(51) Int. Cl.[7] .......................... H01J 49/26; H01J 49/00; B01D 59/44

(52) U.S. Cl. .................................... 250/288; 250/423 R

(58) Field of Search ................................ 250/306, 288, 250/423 R

(56) References Cited

U.S. PATENT DOCUMENTS 5,668,370 A 9/1997 Yano et al. ................. 250/288
6,066,848 A 5/2000 Kassel et al. ............... 250/288
6,207,954 B1 * 3/2001 Andrien et al. ............. 250/288
6,318,157 B1 * 11/2001 Corso ........................ 73/61.52

FOREIGN PATENT DOCUMENTS

| | | |
|---|---|---|
| EP | 0966022 A2 | 12/1999 |
| WO | WO 99/13492 | 3/1999 |
| WO | WO 99/65058 | 12/1999 |

OTHER PUBLICATIONS de Biasi, Verner et al., "High Throughput Liquid Chromatography/Mass Spectrometric Analyses Using a Novel Multiplexed Electrospray Interface", *Rapid Commun. Mass Spectrom*, 13 (1999) 1165–1168.

* cited by examiner

*Primary Examiner*—Bruce Anderson
*Assistant Examiner*—Zia R. Hashmi
(74) *Attorney, Agent, or Firm*—Dorsey & Whitney LLP

(57) ABSTRACT

A multiple sample mass spectrometer having multiple atmospheric pressure ionization probes, each forming an ion spray with passages associated with each of said ion sprays for introducing sample ions into the mass spectrometer for analysis. The flow of ions through selected passages is selectively blocked whereby to permit analysis of ions from selected ionization probes.

16 Claims, 6 Drawing Sheets

MASS SPECTROMETER WITH A PLURALITY OF IONIZATION PROBES

BRIEF DESCRIPTION OF THE INVENTION

This invention relates generally to mass spectrometers, and more particularly to a mass spectrometer having a plurality of ionization probes.

BACKGROUND OF THE INVENTION

Atmospheric pressure ionization (API) sources including electrospray (ES) and atmospheric pressure chemical ionization (APCI) sources which are interfaced with a mass spectrometer have typically operated with a single sample probe. U.S. Pat. No. 5,668,370 describes a mass spectrometer with a plurality of API sources. There is described an API source which includes an ES and an APCI probe which can be selectively brought opposite the input aperture of a mass spectrometer. A relatively complex mechanical arrangement is required to bring the probes opposite the input aperture.

International Publication No. WO 99/13492 describes an API source which includes a plurality of probes directed at a capillary tube which conveys samples into a mass spectrometer. The individual probes are selectively operated to sequentially introduce sample ions into the capillary or they can be simultaneously operated to provide sample ion mixtures to the capillary tube. The fact that the sample applied to the probes is selectively turned on and off may result in clogging of the sample probe.

There is a need for a sample multiprobe API source in which the sources are continuously operated and the ionized sample reaching the coupling orifice is controlled or switched to arrive from selected sources.

OBJECTS AND SUMMARY OF THE INVENTION

It is a general object of the present invention to provide a multiprobe API source in which the sources are selectively coupled to the mass spectrometer inlet aperture or capillary.

It is another object of the present invention to provide a multiprobe API source in which the individual probes are coupled to the inlet aperture or capillary via gas passages in which the passage of ions can be selectively blocked to thereby selectively connect the probes to the inlet aperture or capillary.

The foregoing and other objects of the invention are achieved by a mass spectrometer in which a plurality of API source probes are coupled through an inlet aperture or capillary to the low pressure region of the mass spectrometer by individual conduits which include means for selectively blocking the flow of ions from the associated probe whereby ions from selected probes enter the aperture or capillary.

BRIEF DESCRIPTION OF THE DRAWINGS

The invention will be more clearly understood from the following detailed description when read in conjunction with the accompanying drawings in which.

DESCRIPTION OF PREFERRED EMBODIMENT(S)

Figure 1:
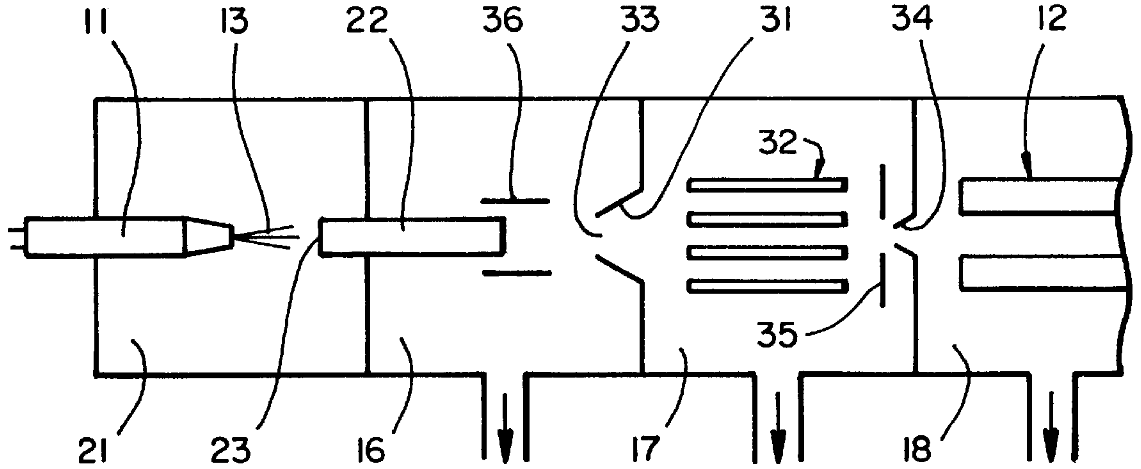
FIG 1 (PRIOR ART)
FIG. 1 shows an API probe coupled to a mass spectrometer via a capillary tube in accordance with the prior art.

Referring to FIG. 1, a prior art mass spectrometer with an atmospheric pressure ionization probe 11 is illustrated coupled to a mass analyzer 12 by an ion transmission assembly. Although a quadrupole mass analyzer 12 is illustrated, it will be apparent to those skilled in the art that the mass analyzer may include, and is not limited to, time of flight (TOF), quadrupole, Fourier transform (FTMS), ion trap, magnetic sector or hybrid mass analyzers. The atmospheric pressure ion source (API) may comprise an electrospray ion source (ES) or atmospheric pressure chemical ionization source (APCI). In any event, the source includes an ion probe 11 which forms an ion spray 13. The ionization mechanism involves the desorption at atmospheric pressure of ions from the fine electrically-charged particles formed by the ES or APCI probe.

The sample liquid is delivered to the API probe by, but is not limited to, liquid chromatography pumps, syringe pumps, gravity-feed vessels, pressurized vessels and/or aspiration-feed vessels. Samples may also be introduced using auto-injectors, separation systems such as liquid chromatography or capillary electrophoresis, capillary electrophoresis chromatography and/or manual injection valves connected to the API probe.

The ion transmission assembly includes successive chambers 16, 17 and 18, maintained at successively lower pressures with the mass analyzer 12 in the lowest pressure chamber. The first chamber 16 communicates with the atmospheric pressure ionization chamber 21 via a capillary tube 22. Due to the potential at the end of the capillary tube, ions are caused to travel to the capillary tube where the difference in pressure between the chambers 16 and 21 cause ions and gases to enter the orifice 23 of the capillary tube and flow through the capillary passage into the chamber 16. The other end of the capillary is opposite a skimmer 31 which separates the chamber 16 from the chamber 17 which houses an ion guiding octopole lens assembly 32. The skimmer includes a central orifice or aperture 33 which may be aligned with the axis of the bore of the capillary or the capillary bore may be slightly off-axis to reduce neutral noise as described in U.S. Pat. No. Re 35,413. A tube lens 36, as described in U.S. Pat. No. 5,157,266 cooperates with the end of the capillary to force ions into the center of the expanding ion flow which leaves the capillary and travels toward the skimmer 31. The octopole lens assembly 32 is followed by ion optics which may comprise a second skimmer 34 and lens 35 which direct ions into the analyzing chamber 18 and into a suitable mass analyzer 12. The combination of capillary tube 22, skimmer 31, lens 32, skimmer 34 and lens 35 form the ion transmission assembly.

With only one API probe, operation of the mass spectrometer is essentially limited to use with a single sample source or if samples from multiple sources are to be analyzed the sample sources must be selectively coupled to the single probe. however, such operation would result in some contamination of successive samples because of the residual sample material residing in the probe.

The prior art as described above provided mass spectrometers with multiple atmospheric pressure ionization probes. In the prior art the entry orifice to the mass analyzing system is substantially in-line with the outlet of the ion probes which forms the sample ions. The arrangement provides excellent performance for a majority of solvent systems used in atomospheric pressure API analysis. However, when non-volatile buffer systems are used, there is the possibility of fouling the intake aperture or capillary tube by deposition of salt from non-desolvated droplets that strike the sampling orifice and evaporate. The deposited salts gradually block the flow of sample ions and reduce performance of the overall system by progressively reducing the number of ions transmitted to the mass analyzer. In co-pending application Ser. No. 09/160,502, filed Sep. 24, 1998 assigned to the common assignee, there is provided sampling orifices which are off-line from the capillary orifice or input aperture in so that the spray is directed away from the input orifice whereby fouling of the orifice is minimized.

Figure 2:
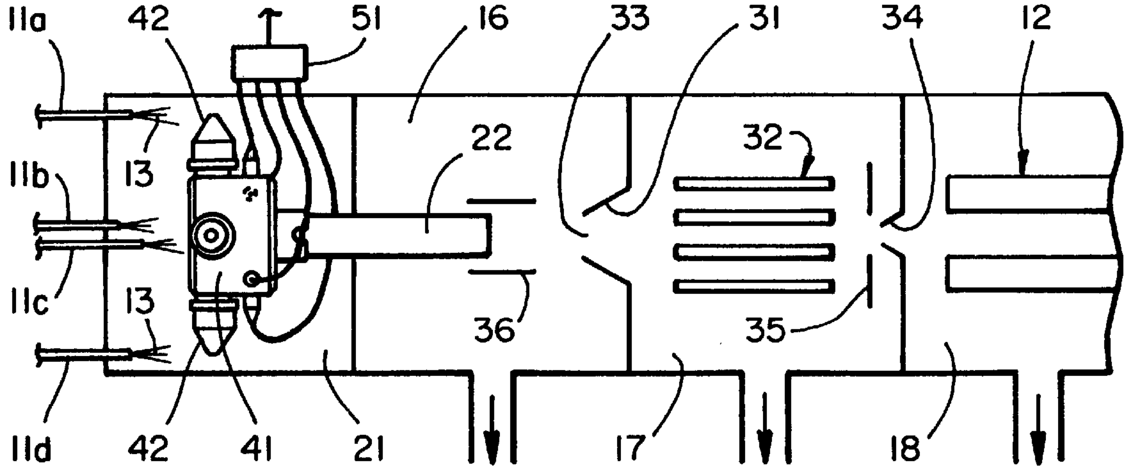
FIG. 2 shows multiple API probes coupled to a mass spectrometer through nozzles which communicate with the capillary tube via passages formed in a coupler.

In accordance with one embodiment of the present invention, there is provided a multiport coupler 41 which includes a plurality of nozzles 42 which cooperate with a plurality of probes 11*a*, 11*b*, 11*c* and 11*d*. The ion spray 13 from each probe travels past an associated nozzle 42 at an angle with respect to its axis. The nozzles each include an orifice 43 which communicates with passages 44, 46, FIGS. 3 and 4. The first passage 44 of each nozzle is connected to a second passage 47 in the coupler which in turn is connected to the capillary 22 via a common passage 48. The pressure differential between the atmospheric pressure chamber 21 and the lower pressure chamber 16 causes ions to flow through the orifice 43 and along the second passages 47 and through the common passage 48 through the capillary into the low pressure region. In the example illustrated in FIGS. 2–4, there are four offline nozzles 42 which deliver ions via second passages 47 to the common passage 48 and capillary 22. With the API probes, 11*a*, 11*b*, 11*c* and 11*d*, continuously operating, a means for blocking the flow of ions through a first passage 44 associated with an orifice 43 associated with selected probes is required. By proper selection, the eluent from different sources may be selectively introduced for mass analysis. The ions from two sources may be introduced for analysis and calibration or other combination of ions from different liquid samples can be introduced into the mass spectrometer.

Figure 3:
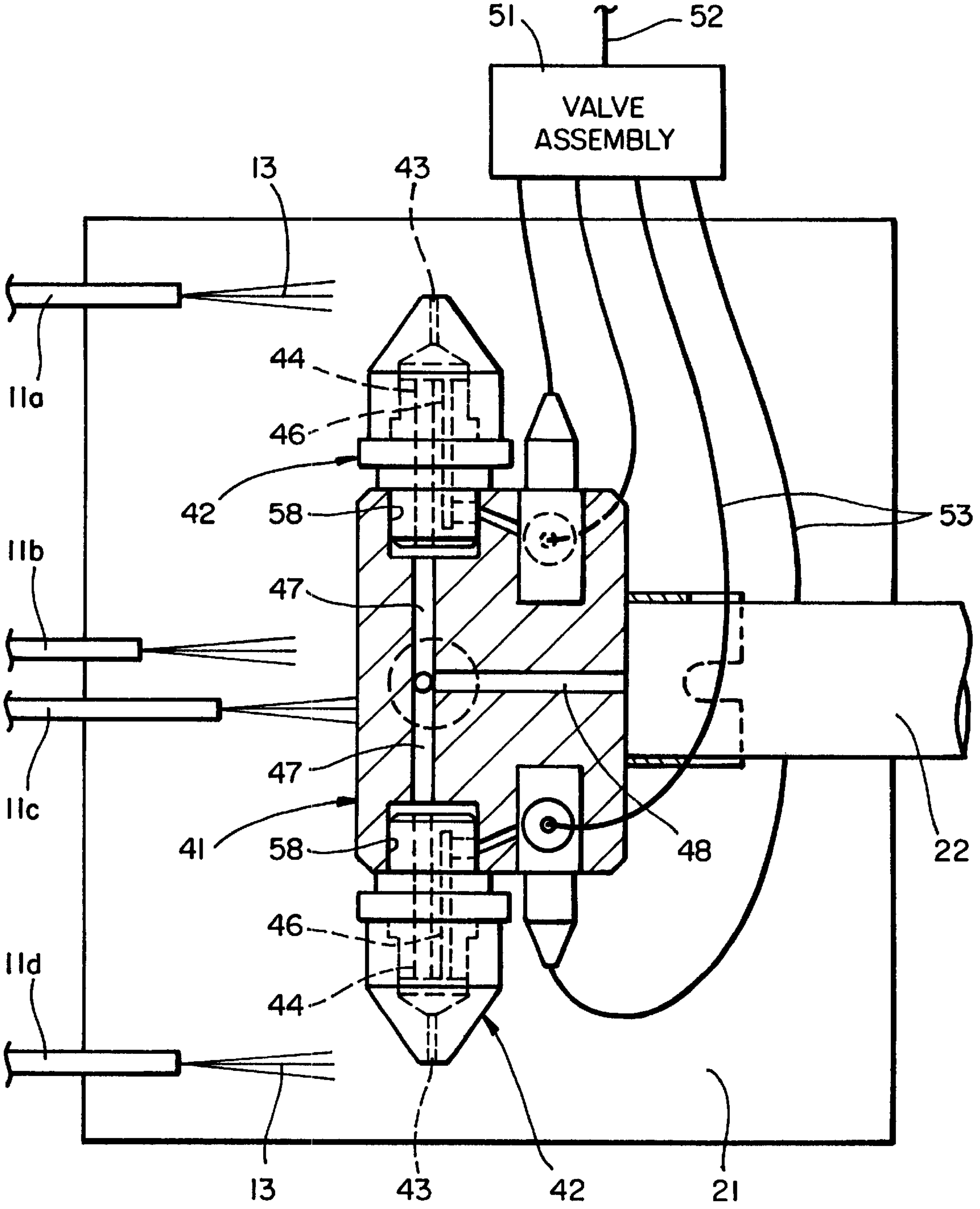
FIG. 3 is an enlarged view of the coupler of FIG. 2.
Figure 4:
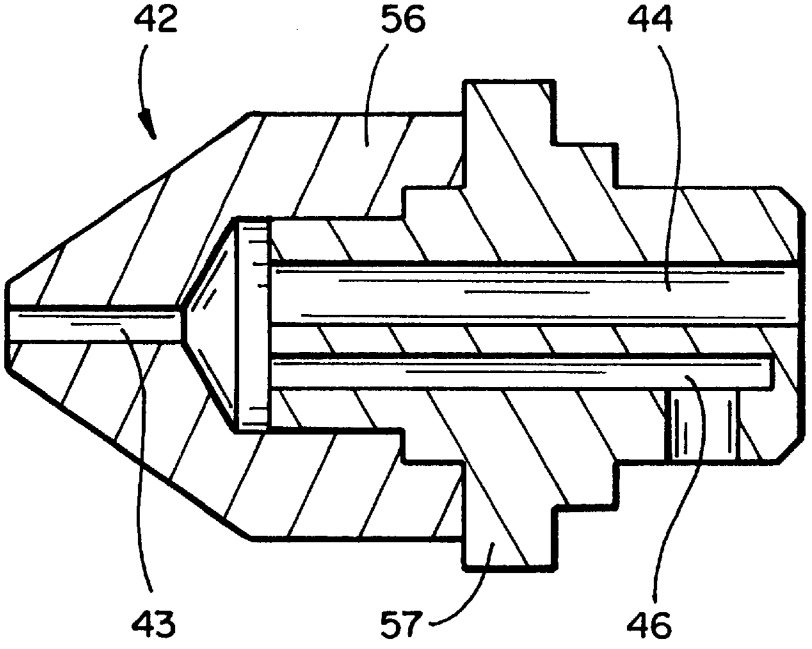
FIG. 4 is a sectional view of the nozzle assembly which communicates with the coupler passages.

In accordance with one embodiment of the present invention, the flow of ions through selected orifices 43 and passages 44 is pneumatically blocked. Referring particularly to FIG. 3, a source of pressurized inert gas (not shown) supplies gas under pressure to a valve assembly 51 via the conduit 52. The valve assembly 51 includes a manifold which can selectively communicate with one of the conduits 53. For example, a solenoid valve may be associated with each of the conduits whereby to connect the conduits to the manifold to supply or block the flow of gas through the associated conduit. Each conduit 53 is coupled to a nozzle assembly 42 to apply gas under pressure to the passages 46 which inject air into the orifice 43 via the passage 46. Thus, when a selected valve is opened, gas will flow through the conduits 53 through passage 46 outwardly from the orifice 43 preventing ions from entering the orifice. The orifices 43 are formed in caps 56, FIG. 4, which are coupled to the bodies 57 adapted to fit into wells 58 formed in the coupler 41 which includes the passages 47 and 48.

For some applications, it may not be known whether positive or negative ions will provide the best mass spectrum of the compound of interest. Most mass spectrometers take a significant amount of time switching between positive and negative ion modes (approximately one second switching time is typical). The result is that it is not practical to switch back and forth between positive and negative ion modes during the same chromatographic run. So, if a compound does not form enough ions in positive ion mode, the scientist must redo the analysis in negative ion mode. The amount of time required to switch is in large part governed by the speed with which the high-voltage power supplies (including voltage power supply for the electrospray ion source) may be switched.

Figure 5:
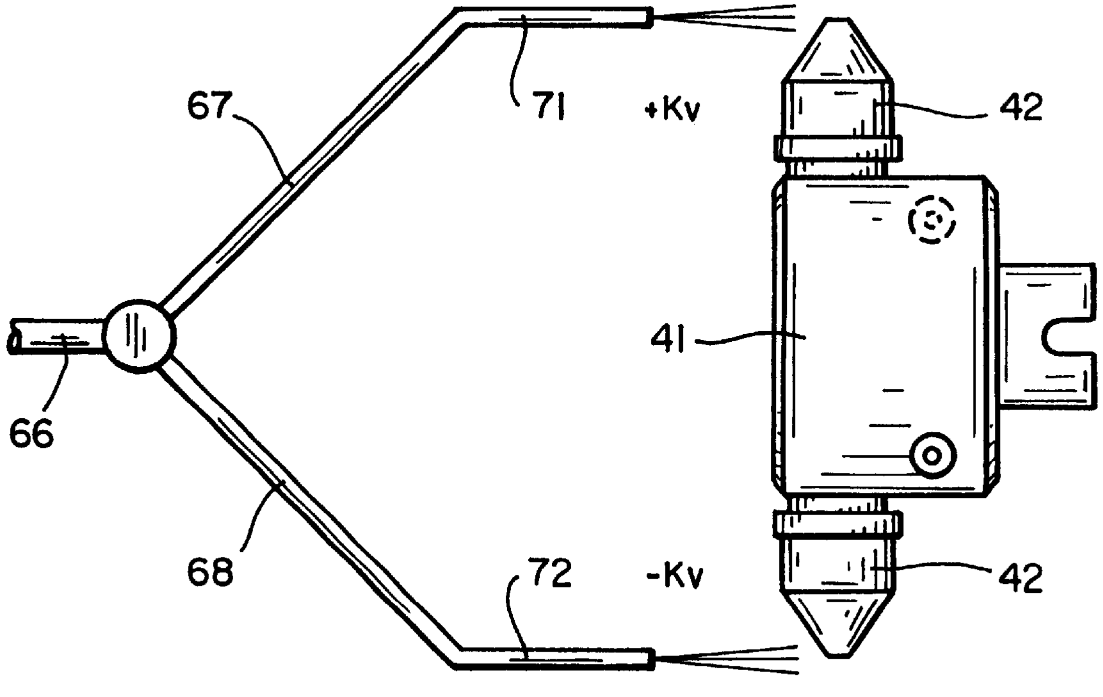
FIG. 5 shows a coupler configured to sample positive/negative ions generated from a single sample source.
Figure 6A:
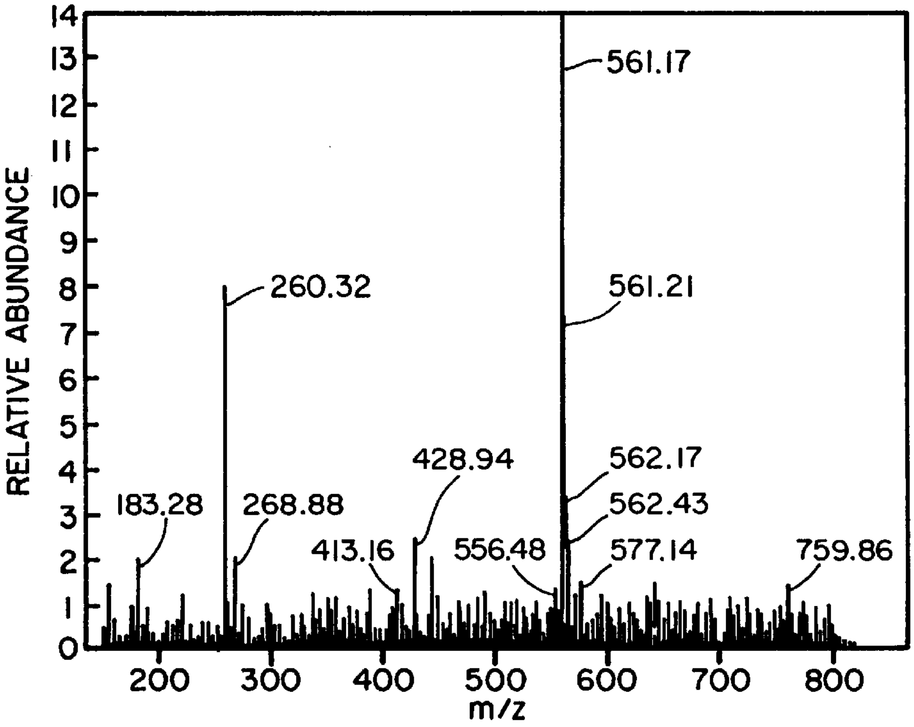
FIGS. 6A–6D are mass spectrograms of four different samples applied to individual probes with sequential coupling to the different probes.
Figure 6B:
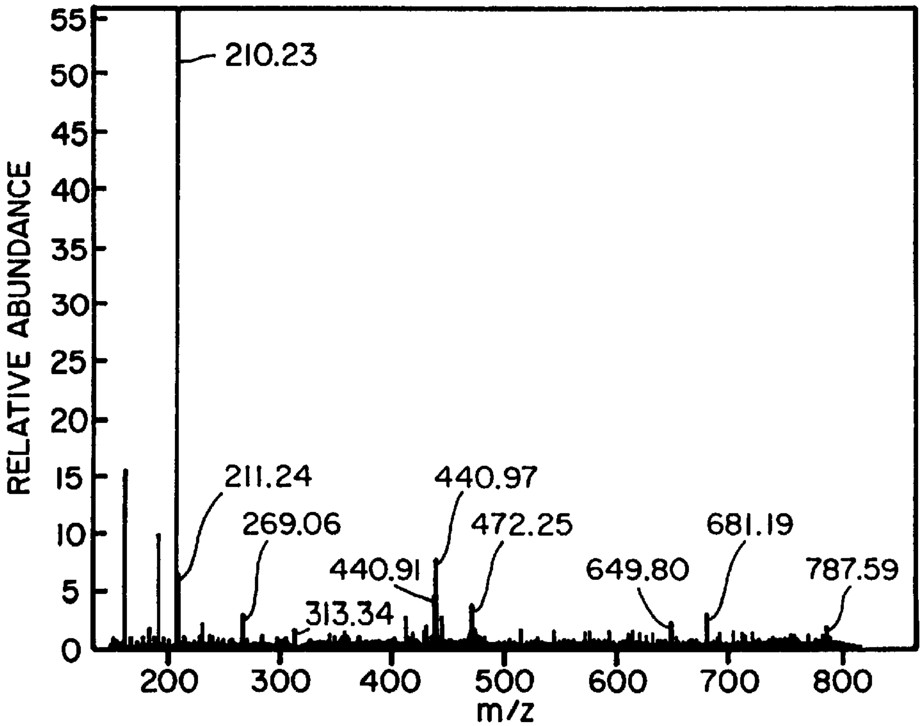
Figure 6C:
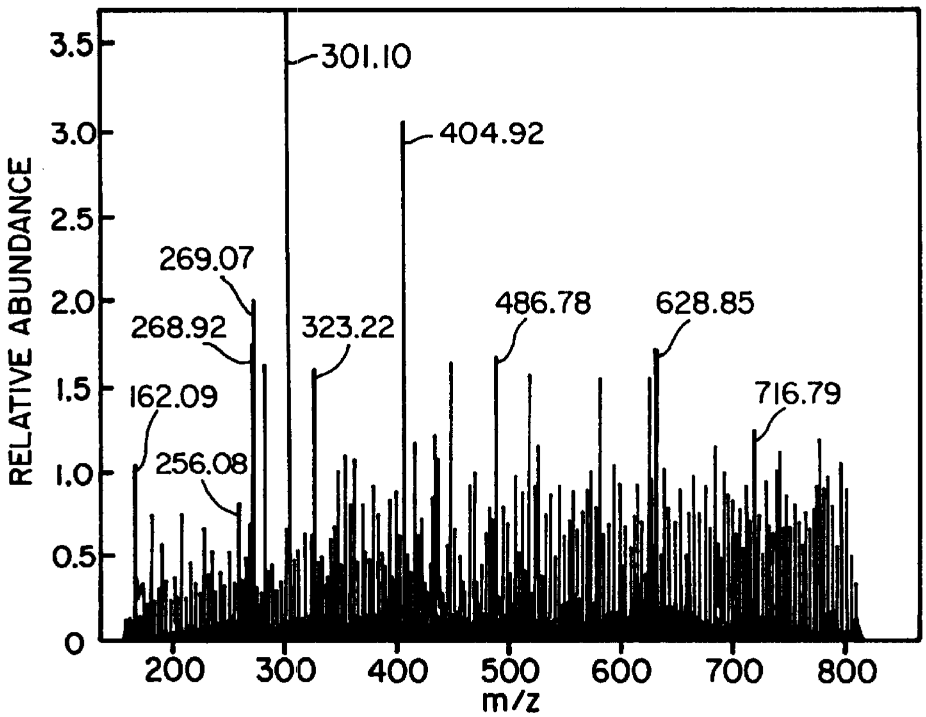
Figure 6D:
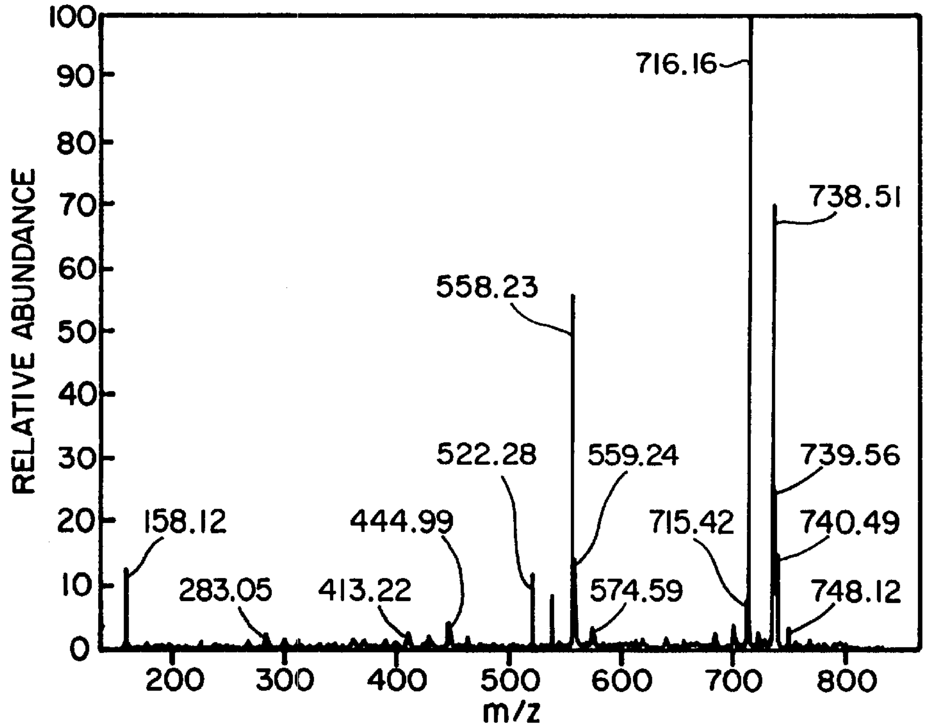

In accordance with another embodiment of the invention, both positive and negative sprays may be formed at the same time through different probes, FIG. 5. Two (or more) probes are used, with separate power supplies (not shown) for positive and negative sprays. The sample flow 66 can be split into two flow passages 67, 68, so that each probe 71, 72 is always spraying. The potentials at the capillary or other inlet determine which ions will enter the capillary and be guided through the mass spectrometer and thus mass-analyzed. Switching the power supplies for these voltages, which have much smaller magnitude, is much faster than for the sprayer power supplies. Thus, by using two separate sprayers and power supplies along with the multi-port sampler, positive/negative switching can be implemented with a much faster switching time, making it possible to do positive/negative switching during a chromatographic run.

Figure 7A:
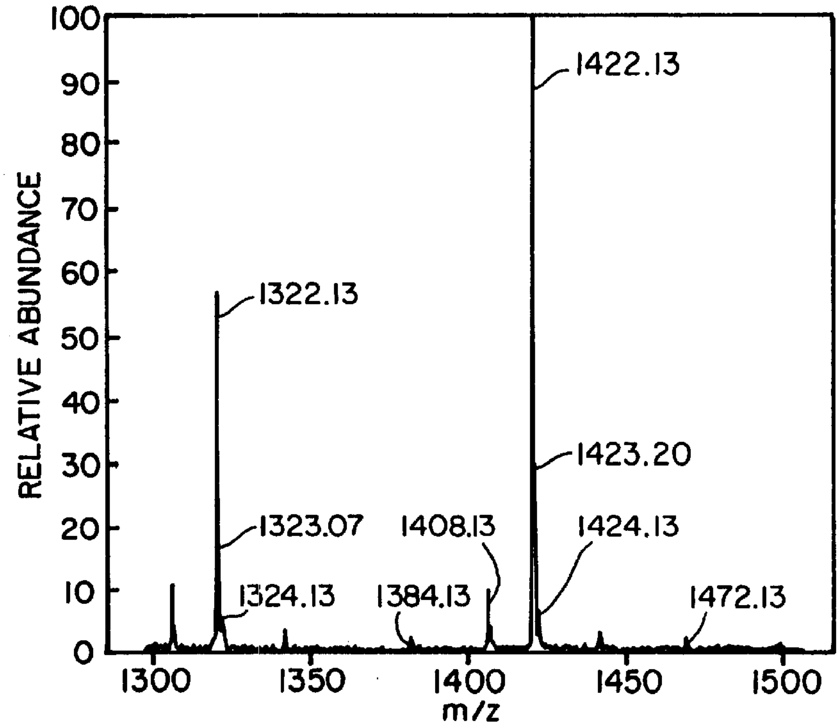
FIGS. 7A and 7B are mass spectrograms of the same sample applied to two probes operated for negative and positive ionization.
Figure 7B:
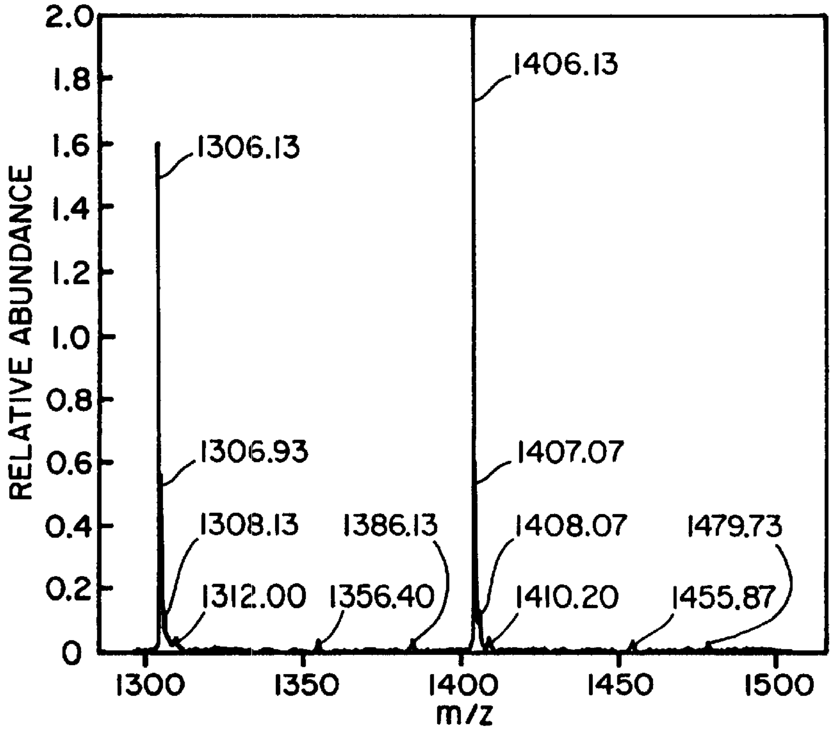

An ionization source with four ionization probes, 11*a*, 11*b*, 11*c*, 11*d*, extending into an ionization chamber 21 having a four-part coupler 41 was associated with the capillary input of a Finnigan LCQ DECA. The four ionization probes 11*a*–11*d* were connected to receive four different samples: propranolol (a), minoxidil (b), sulphamethazine (c), and erythromycin (d), respectively, which were continuously operated. The coupler was controlled to sample ions (a), (b), (c), (d), sequentially. The mass spectrum of the four samples shown in FIGS. 6*a*, 6*b*, 6*c* and 6*d*, respectively, were obtained in less than one minute. In a second experiment, using the configuration shown in FIG. 5, a sample of Ultramark 1621 was analyzed in both the negative and positive mode by switching to receive sample ions from the sprayers 71 and 72. The mass spectrum is shown in FIGS. 7*a* and 7*b*.

Thus, there has been provided an assembly which allows efficient use of a mass spectrometer by providing an atmospheric pressure ionization source including a plurality of API probes. The assembly provides for selectively connecting for sampling the spray from selected probes 11 while preventing sampling of ions from other probes 11. For example, in the case of four sprays, as shown, three sprays may be blocked while the fourth is sampled.

Although there has been described the use of a gas for stopping or blocking ions from entering the vacuum region of the mass spectrometers, it is apparent that a solenoid or the like valves may be associated with each of the passages 44 to block or prevent flow of ions through the passages 47 and 48 to the capillary 22.

The foregoing descriptions of specific embodiments of the present invention have been presented for purposes of illustration and description. They are not intended to be exhaustive or to limit the invention to the precise forms disclosed, and obviously many modifications and variations are possible in light of the above teaching. The embodiments were chosen and described in order to best explain the principles of the invention and its practical application, to thereby enable others skilled in the art to best use the invention and various embodiments with various modifications as are suited to the particular use contemplated. It is intended that the scope of the invention be defined by the claims appended hereto and their equivalents.

What is claimed is:

1. An ion source for a mass spectrometer comprising:

a chamber at or near atmospheric pressure, a plurality of ionization probes extending into said chamber, each forming an ion spray of sample introduced to said probe, an aperture or capillary coupling said chamber to a mass analyzer assembly, a first passage communicating with said aperture or capillary, a plurality of second passages connected to said first passage, a plurality of orifices, each communicating with one of said second passages positioned to receive and direct ions from an associated ion spray into said first passage, and means associated with each of said first and second passages for selectively blocking the flow of ions through said first and second passages.

2. An ion source as in claim 1 in which said means for blocking the passage of ions comprises means for directing gas outwardly through the orifice associated with said first passage.

3. An ion source as in claim 1 in which said means for blocking passage of ions comprises a valve disposed in each of said second passages.

4. An ion source as in claim 1 in which said ionization probe is an electrospray probe.

5. An ion source as in claim 1 in which said ionization probe is an atmospheric pressure chemical ionization probe.

6. An ion source as in claim 1 in which said ionization probes comprise electrospray probes and atmospheric pressure chemical ionization probes.

7. An ion source as in claim 1 in which one or more of said atmospheric pressure ionization probes is unblocked at any one time.

8. An ion source as in claim 4 in which one or more of said orifices is unblocked at any one time.

9. An ion source as in claim 5 in which one or more of said orifices is unblocked at any one time.

10. An ion source as in claim 6 in which one or more of said orifices is unblocked at any one time.

11. An ion source as in claim 1 in which said passages are formed in a block attached to said capillary.

12. An ion source as in claims 1, 2, 3, 4 or 5 in which said ionization probes include probes for selectively forming both negative and positive ions.

13. A mass spectrometer including:

a mass analyzer assembly, an ionization source including an ionization chamber, a plurality of ionization probes extending into said chamber, said probes adapted to form ions from samples introduced into said probes, an aperture or capillary coupling the chamber to the mass analyzer, a multiport coupler having a plurality of first passages, each including an input orifice at one end for receiving ions from said probes and for directing ions into said aperture or capillary, means associated with each of said first and second passages for selectively blocking the flow of ions through said passages.

14. An ion source as in claim 13 in which said means for blocking the passage of ions comprises means for directing gas outwardly through said input orifice.

15. A mass spectrometer as in claim 13 in which said plurality of ionization probes are selected from atmospheric pressure chemical ionization and electrospray ionization probes.

16. A mass spectrometer as in claim 13 in which said ionization probes include probes for forming both negative and positive ions.

* * * * *